United States Patent
Vinchon

(10) Patent No.: US 8,031,957 B1
(45) Date of Patent: Oct. 4, 2011

(54) REWRITABLE LOSSY COMPRESSION OF GRAPHICAL DATA

(75) Inventor: Eric Vinchon, Lyons (FR)

(73) Assignee: Adobe Systems Incorporated, San Jose, CA (US)

( * ) Notice: Subject to any disclaimer, the term of this patent is extended or adjusted under 35 U.S.C. 154(b) by 1113 days.

(21) Appl. No.: 11/689,226

(22) Filed: Mar. 21, 2007

Related U.S. Application Data

(60) Provisional application No. 60/819,959, filed on Jul. 11, 2006.

(51) Int. Cl.
| | |
|---|---|
| G06K 9/36 | (2006.01) |
| G06K 9/46 | (2006.01) |
| G06K 9/48 | (2006.01) |
| G06T 15/00 | (2011.01) |
| G06T 17/00 | (2006.01) |
| G06T 11/20 | (2006.01) |

(52) U.S. Cl. ........ 382/241; 382/232; 382/243; 345/419; 345/428; 345/441; 345/442; 345/443

(58) Field of Classification Search ................. 382/241, 382/243, 232; 345/419, 428, 441, 442, 443
See application file for complete search history.

(56) References Cited

U.S. PATENT DOCUMENTS

| | | | | |
|---|---|---|---|---|
| 6,208,347 | B1 * | 3/2001 | Migdal et al. | 345/419 |
| 6,496,185 | B1 * | 12/2002 | Keam | 345/419 |
| 6,600,485 | B1 * | 7/2003 | Yoshida et al. | 345/419 |
| 6,611,267 | B2 * | 8/2003 | Migdal et al. | 345/428 |
| 6,806,874 | B2 * | 10/2004 | Biermann et al. | 345/420 |
| 6,806,876 | B2 * | 10/2004 | Klein | 345/428 |
| 7,348,976 | B2 * | 3/2008 | Mori | 345/423 |
| 2002/0050992 | A1 * | 5/2002 | Deering | 345/423 |
| 2005/0078109 | A1 * | 4/2005 | Mori | 345/419 |

* cited by examiner

*Primary Examiner* — Jingge Wu
*Assistant Examiner* — Bernard Krasnic
(74) *Attorney, Agent, or Firm* — Robert C. Kowert; Meyertons, Hood, Kivlin, Kowert & Goetzel, P.C.

(57) ABSTRACT

A computer-implemented method can provide compression of a digital representation of an object. The digital representation can include a graphical data structure with graphical data defining the object in terms of a definition of respective faces of the object. Each face can be defined in terms of a surface for the face and each edge of the face on that surface. The method can include, for respective faces of the object, accessing the definition of the face in the graphical data structure, generating a compressed definition of the face and replacing the definition of the face in the graphical data structure by the compressed definition of the face.

15 Claims, 13 Drawing Sheets

SOLID

↳    < SHELL >

↳    < SHELL >

·
           ·

SHELL  ·

↳    < FACE >

↳    < FACE >

·
           ·

FACE  ·

↳    < SURFACE >

↳    < LOOP >

< LOOP >

LOOP

↳    < EDGE >

↳    < EDGE >

·
           ·

EDGE  ·

↳    < VERTEX 1 >

↳    < VERTEX 2 >

< 3D CURVE > / < 2D CURVE 1 >

< 2D CURVE 2 >

Fig. 4

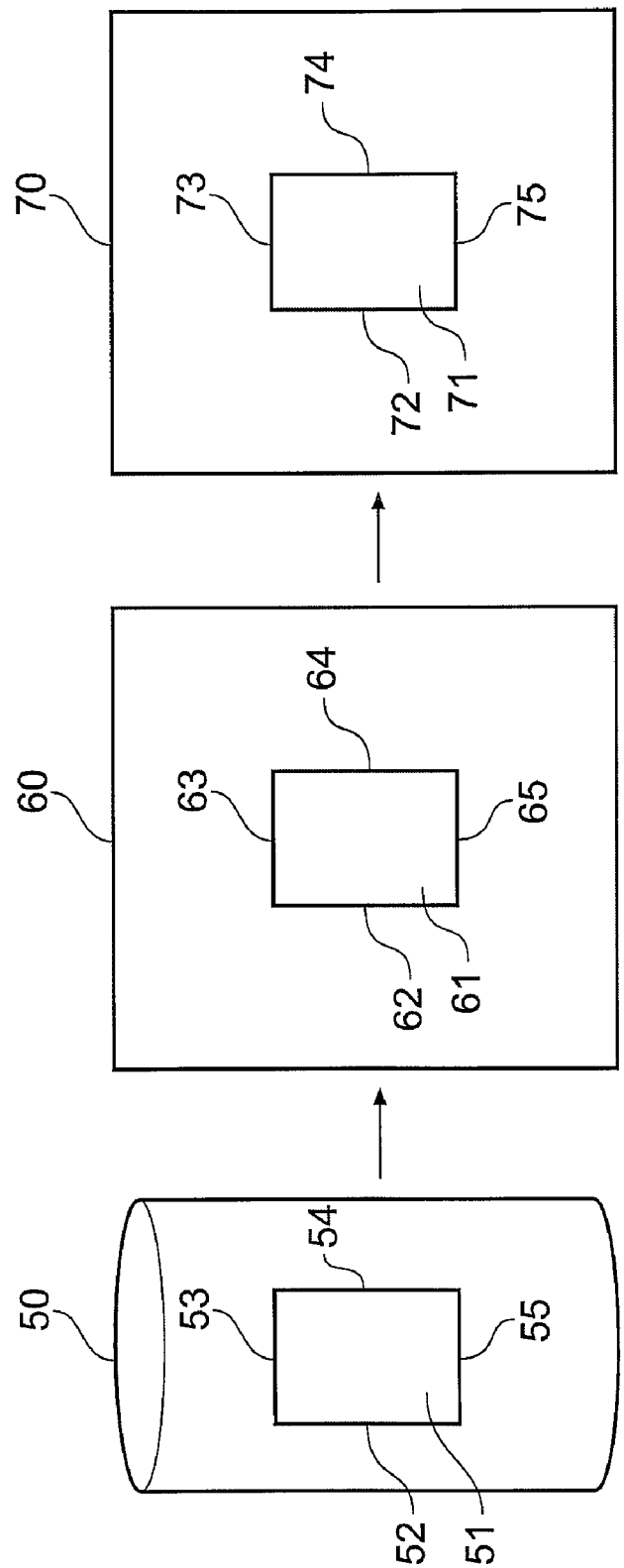

REWRITABLE LOSSY COMPRESSION OF GRAPHICAL DATA

This application claims priority to U.S. Provisional Application No. 60/819,959, filed Jul. 11, 2006.

BACKGROUND

The invention relates to the compression of a digital representation of an object.

A digital representation of an object includes a graphical data structure with graphical data defining the object in terms of a definition of respective faces of the object. The faces can in turn be defined in terms of a surface for the face and the edges of the faces on that surface.

Such graphical data structures can be used to define complex objects that comprise very many faces. Especially for a large object, a large volume of data is typically required to define the object.

It is known to provide compression for such graphical data structures. However, if a high degree of compression is desired, then some loss of information may occur. This can result in a degradation of the information. A problem that can occur with complex graphical data is that there are potentially complex interrelationships between in data elements of the data structure, so that a loss of information can propagate through the data structure and lead to further degradation. Also, it can result in preventing the data structure from being stored and retrieved multiple times without significant further degradation of the information.

An embodiment of the present invention seeks to provide for rewritable compression of graphical data structures.

SUMMARY OF THE INVENTION

Aspects of the present invention are defined in the appended claims.

An embodiment of the invention can provide a computer-implemented method for compressing a digital representation of an object. The digital representation can include a graphical data structure with graphical data defining the object in terms of a definition of respective faces of the object. Each face can be defined in terms of a surface for the face and each edge of the face on that surface with adjacent faces sharing a common edge. The method can include, for respective faces of the object, accessing the definition of the face in the graphical data structure, generating a compressed definition of the face and replacing the definition of the face in the graphical data structure by the compressed definition of the face.

An embodiment of the invention can also provide a system and/or a computer program product that implements the aforementioned method.

An aspect of the invention also provides a compressed data structure forming a product of the aforementioned method for modeling a solid forming at least a part of an object. The compressed data structure can comprise one or more parameter fields, wherein the one or more parameter fields includes at least one of:
- one or more face fields, each face field representing a face of the solid and referencing one or more surface fields;
- one or more surface fields, each surface field representing a surface forming at least part of a face and referencing one or more one or more loop fields;
- one or more loop fields, each loop field representing a loop on a surface and referencing one or more one or more edge fields;
- one or more edge fields, each edge field representing an edge of a loop and referencing one or more one or more vertex fields; and
- one or more vertex fields, each vertex field representing a vertex of a loop, at least one parameter field comprising a compressed representation of a parameter.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which:

FIG. 4 is a schematic representation of part of a data structure for representing a solid that forms the whole or part of an object;

FIG. 6 is a schematic representation of an example of a face represented by an example embodiment of the invention;

Figure 1:
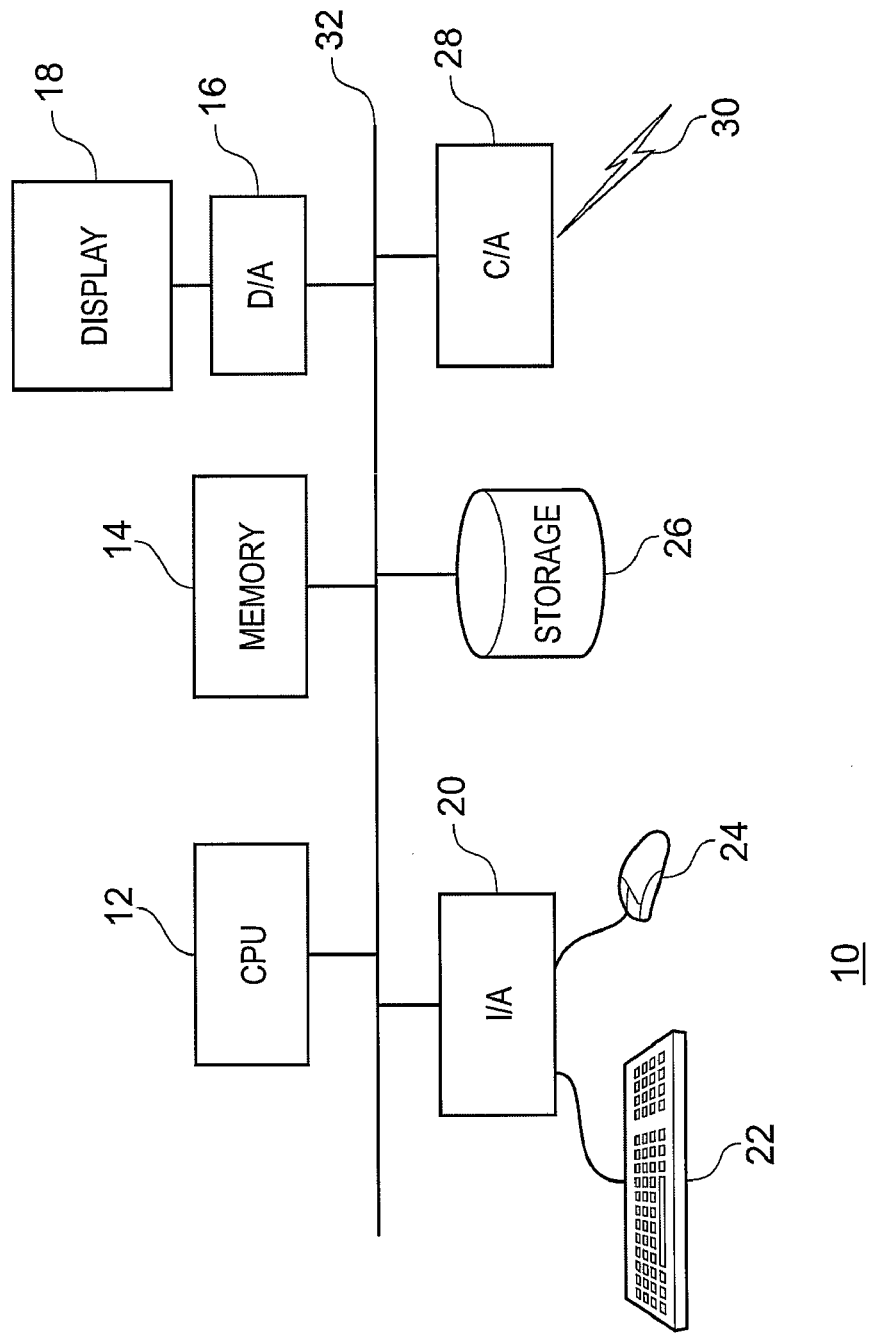
FIG. 1 is a schematic block diagram of an example of a computer system implementing an example embodiment of the present invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

An example embodiment of the invention will be described in the following.

FIG. 1 is a schematic diagram illustrating an example of a computer system 10 for implementing an example embodiment of the present invention. Various components are interconnected by a bus system 32. One or more processors 12 can be provided. Random access memory 14 can also be provided as a working memory. A display adaptor 16 can enable the connection of a display 18. An input/output adaptor 20 can enable the connection of one or more user input devices, for example a keyboard 22 and a mouse 24. Storage 26 can provide for persistent storage of data. In the present example, a data structure that includes a hierarchy of data elements can be stored in the storage 26. A communications adaptor 28 can provide connection to a network via a link 30. It will be appreciated that FIG. 1 is a schematic representation, only, of a computer system, and that the computer system can take many different forms.

Figure 2:
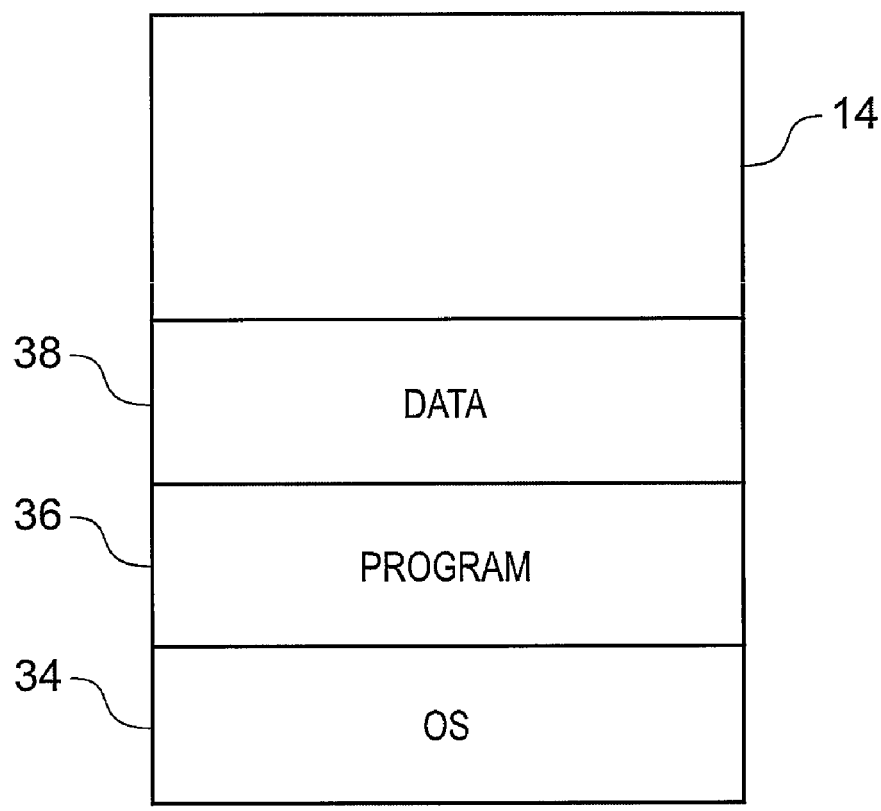
FIG. 2 is a schematic diagram of information held in a memory during operation of the computer system.

FIG. 2 provides a schematic overview of information held in a memory 14 during operation of the computer system. The data in the memory 14 can be loaded, for example, from read-only memory (not shown) and/or from the storage 26. The information in the memory 14 can include components of an operating system 34, components of a program 36 operating on the operating system, and data 38 for use by the operating system 34 and the program 36. In the operation of an example embodiment of the invention, data elements of the data structure referred to with reference to FIG. 1 can be loaded from the storage 26 into the memory 14.

Figure 3:
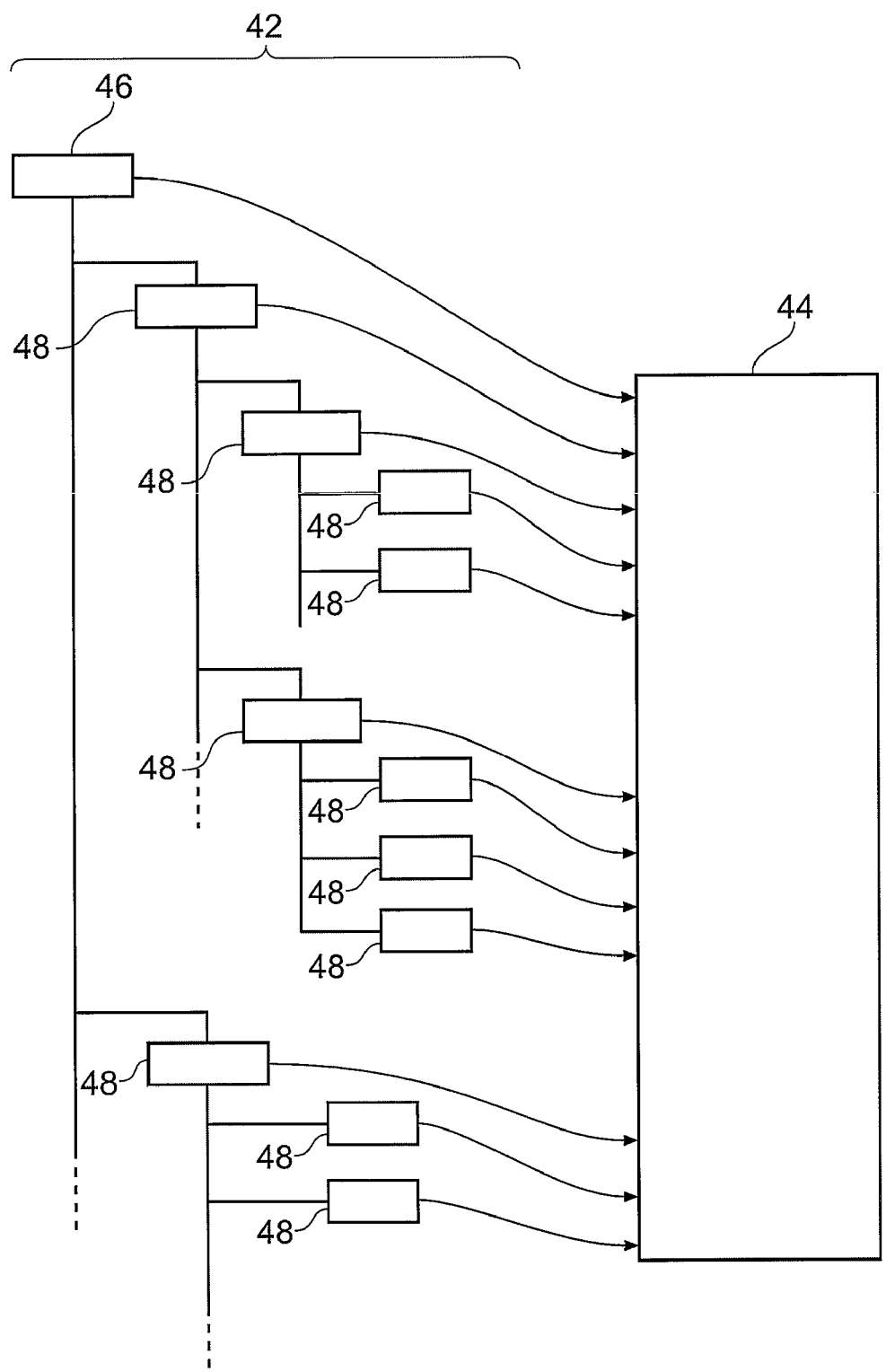
FIG. 3 is a schematic representation of an example of a data structure representing an object.

FIG. 3 is a schematic representation of an example of such a data structure 42. As illustrated in FIG. 3, a hierarchical structure 42 is provided to represent one or more objects. The object(s) can be a physical device, component, assembly, or the like. Within the hierarchical structure 42, a plurality of data elements 46 and 48 are shown. Data element 46 is a root element forming a root node for representing a complete object. The data elements 48 can represent sub-assemblies, components, parts, etc (hereinafter parts) of the object. It is to be understood in this document that references to a "part" in the context of one or more data elements does not mean that an entity concerned is single unitary part, but rather that can be any one of a sub-assembly, a component, etc. The data elements 48 are linked either directly or indirectly to the root node. Through the use of the hierarchical structure 42 illustrated in FIG. 3, various levels of parts can be linked together. For example, elements can be related to components, components can be related to sub-assemblies and the sub-assemblies can be related to other sub-assemblies and/or to the whole object in a manner that permits individual manipulation of the elements, components, sub-assemblies and indeed the whole object.

In an example embodiment of the invention described herein, the hierarchical structure 42 is generated with respect to base data 44. The base data 44 can be a binary file representative of the object which has been generated, for example, by a computer aided design (CAD) package independently of example embodiment described herein. The example embodiment is able to analyze the base data 44 and to generate, from that base data 44, the hierarchical structure 42.

FIG. 4 is a schematic representation of a graphical data structure for representing a solid that forms the whole or part of an object.

The solid can be made up of one or more shells. Each shell can represent an external surface, or skin, of the object. For example a cube with a smaller cube forming a cavity therein could have two shells, one forming the exterior skin of the cube and the other forming the skin of the cavity in the cube.

Each shell can be made up of one or more faces.

Each face is defined in terms of a surface and one or more loops defined on the surface. The surfaces are three dimensional and are defined as being parameterized following 2 parameters u and v. x=f(u,v); y=g(u,v); z=h(u,v). The parameterization functions depend on the surface type. For example the surface may be one of a cylinder, a cone, a sphere, a torus, or a more complex three dimensional surface. The loop forms the boundary of a shape on that surface that corresponds to the face of the object.

A loop can be defined by a series of edges.

Each edge can in turn be defined by a first and a second vertex at the first and second ends of the edge and by a three dimensional curve and/or by a curve defined in the parametric space of the bearing surface.

Each vertex can be defined in terms of spatial coordinates, for example Cartesian (X, Y, Z) coordinates or by polar coordinates.

Figure 5:
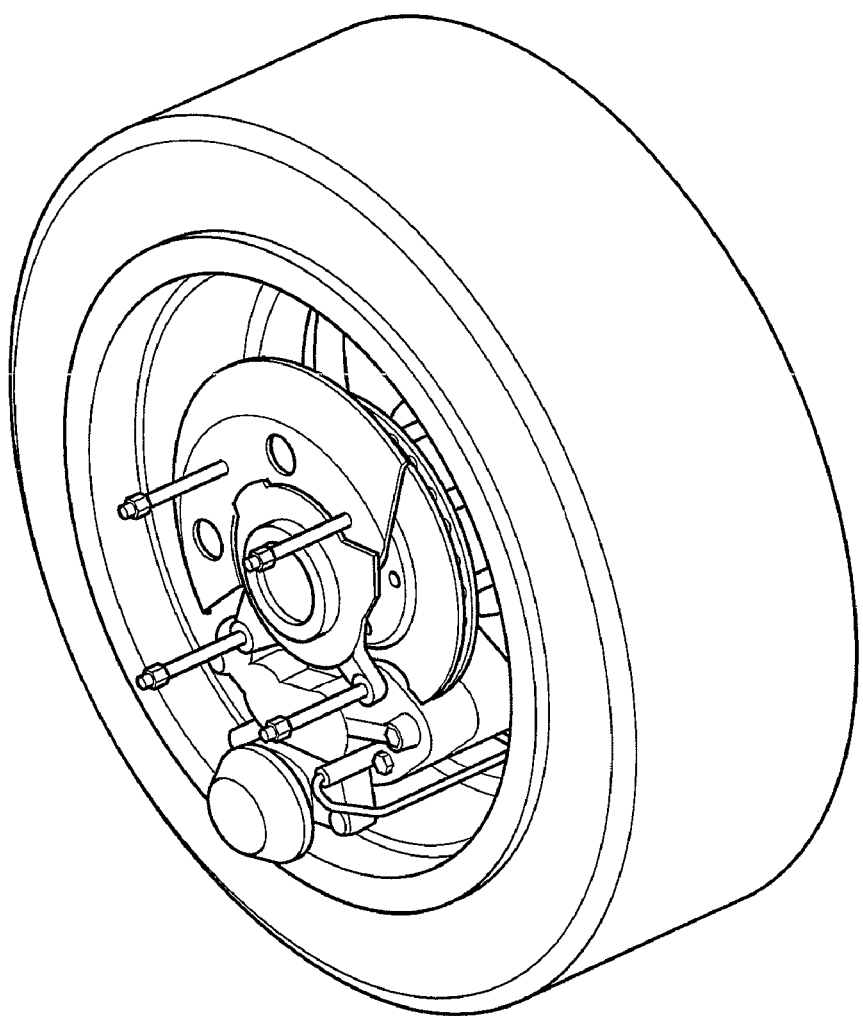
FIG. 5 is a visual representation of example of an object modeled by a data structure as represented in FIGS. 3 and/or 4.

An object represented by such a data structure can be a complex object, for example a building, a machine, a vehicle, etc., for example a wheel assembly as illustrated in FIG. 5.

FIGS. 6 and 7 represent, for illustrative purposes only, two simple examples of faces that can be recognized by an example embodiment of the invention.

FIG. 6A illustrates an example where a face 51 is defined in terms of a cylinder 50 and a loop that includes edges 52, 53, 54 and 55. The face 51 corresponds to the area within the loop on the cylindrical surface 50. All four edges of the loop appear curved in FIG. 6A and extend in three dimensions around the cylindrical surface.

As can be seen in FIG. 6B, where the surface 50 is described in its parametric u,v space to form the planar surface 60, in fact the upper and lower edges 63 and 65 of the loop resolve to straight lines within the plane of the surface 60. The left and right edges 62 and 64 of the loop on the other hand are close to being straight lines, but are in fact slightly curved. The face 61 in FIG. 6B is thus the face 51 mapped from three dimensions onto a planar surface.

It will be appreciated that a lot of information is needed accurately to represent the face formed by the interior of the loop on the cylindrical surface 50. For each edge, a mathematical definition of the curve forming that edge in three dimensions (typically as two two-dimensional curves or one three-dimensional curve) as well as the coordinates of the vertices of the curves (i.e. the intersections of the curves of the loop bounding the face 51). The coordinates are typically defined in terms of floating point numbers and can comprise many bits in order to represent a large object such as the motor car wheel of FIG. 5. Typically at least one of the edges of the face will be shared with an adjacent face to represent different parts of a surface of the object.

Figure 7C:
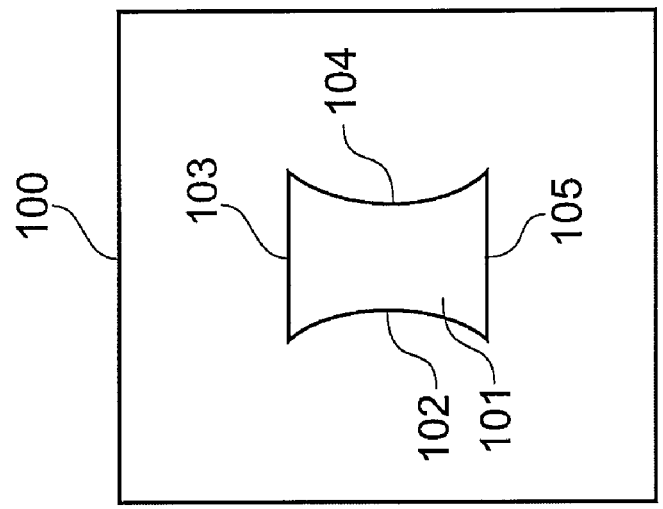
FIG. 7 is a schematic representation of another example of a face represented by an example embodiment of the invention.
Figure 7B:
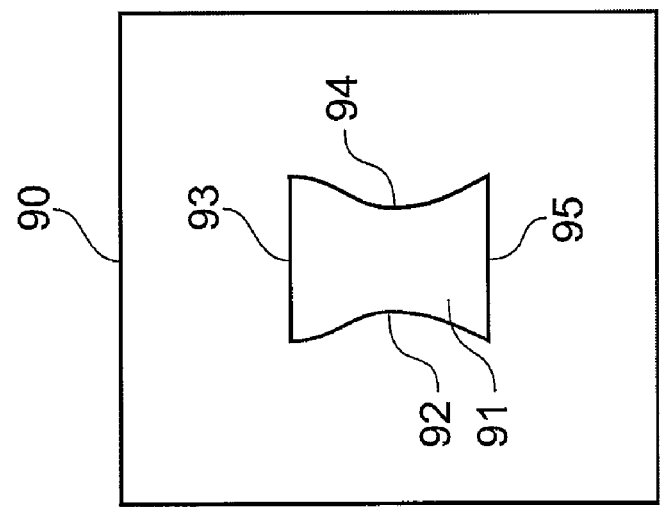
Figure 7A:
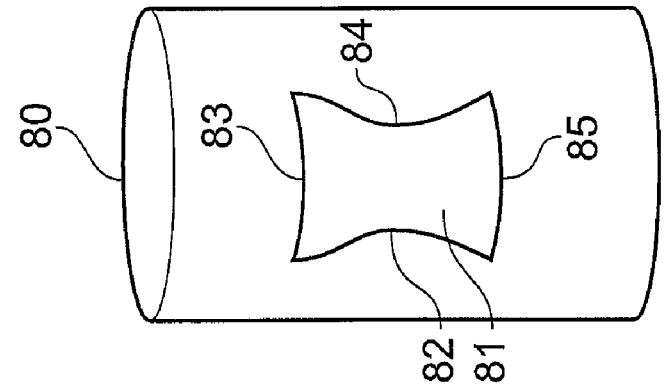

FIG. 7A illustrates another example where a face 81 is defined in terms of a cylinder 80 and a loop that includes edges 82, 83, 84 and 85. The face 81 corresponds to the area within the loop on the cylindrical surface 80. All four edges of the loop appear curved in FIG. 7A and extend in three dimensions around the cylindrical surface.

As can be seen in FIG. 7B, where the surface 80 is described in its parametric u,v space to form the planar surface 90, in fact the upper and lower edges 93 and 95 resolve to straight lines within the plane of the surface 90. The left and right edges 92 and 94 on the other hand are, in this example, complex curves.

As for the example shown in FIG. 6, it will be appreciated that a lot of information is needed accurately to represent the face 81 formed by the interior of the loop on the cylindrical surface 80. For each edge, a mathematical definition of the curve forming that edge in three dimensions (typically as two two-dimensional curves or one three-dimensional curve) as well as the coordinates of the vertices of the curves (i.e. the intersections of the curves of the loop).

It will be appreciated that the examples shown in FIGS. 6 and 7 are very simple examples for illustrative purposes only, and that a very large amount of data will be required to represent a real world object that will comprise many faces having many different shapes and being defined with respect to many different three-dimensional surfaces.

An embodiment of the present invention can enable significant compression of the data needed to represent an object. In this regard, reference will be made to FIGS. 6C and 7C later herein.

Figure 8:
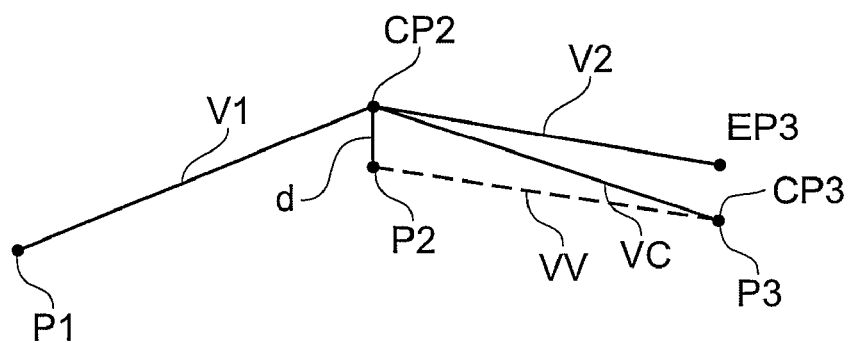
FIG. 8 illustrates the avoidance of the propagation of errors in an example of the embodiment.

FIG. 8 illustrates the avoidance of the propagation of errors in an example of the embodiment.

In the example illustrated in FIG. 8, a vector V1 forms an approximation of the vector between a first uncompressed point P1 and a second uncompressed point P2. As illustrated in FIG. 8, the vector does not align exactly with Point P2, but instead defines a compressed point CP2 that deviates from the uncompressed point by a delta error d. It should be noted that the error is exaggerated in FIG. 8 for illustrative purposes. In practice, the error between the uncompressed point and the compressed point could be very small due, for example to rounding errors.

However, if an error occurs in the definition of the vector V1, this can propagate through the model if a new vector is then to be computed from the point P2 to the point P3. If we assume that the virtual vector VV would be calculated, if this is computed from the uncompressed point P2, even if it accurately defined the third point P3, then in the compressed representation the third point would be represented by an erroneous position EP3 and the delta error would be propagated. In fact, if a further rounding error occurred, then the representation of the third point could include yet a further delta error.

In order to avoid the propagation of errors in this manner, in an example embodiment, the compressed point CP2 is used to replace the uncompressed point P2 in a working copy of the data structure, so that in the calculation of the point P3 a vector VC can be generated that is based on the compressed point CP2 and the uncompressed point P3, so that the compressed point CP3 as represented by the compressed vector VC can correspond to the uncompressed point P3 (subject to rounding errors). In this manner, the example embodiment can avoid the propagation of errors in the computation of the compressed representation that can result, for example, as a result of rounding errors, truncation of the values, etc.

Figure 9:
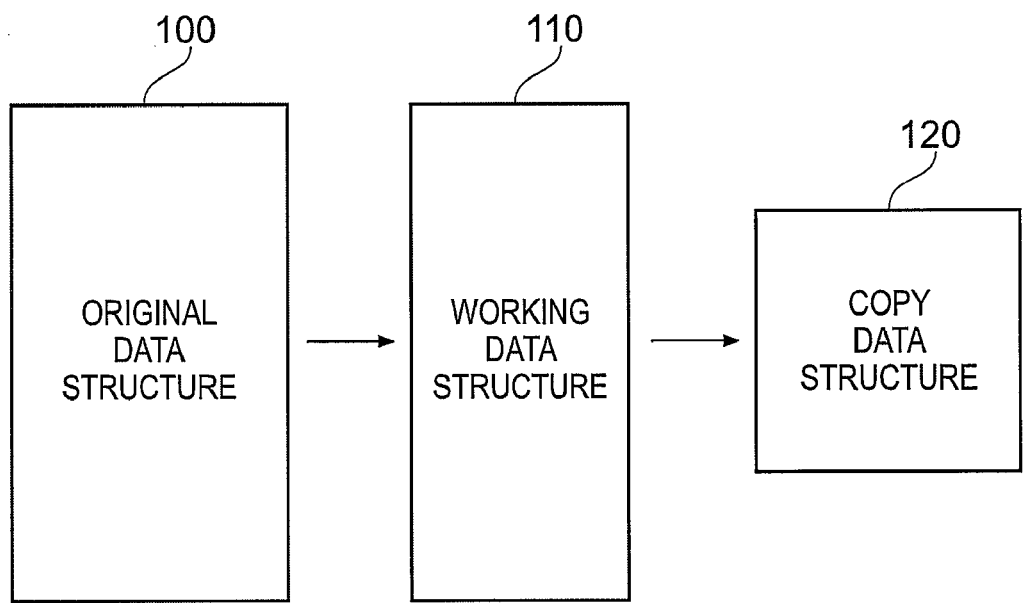
FIG. 9 is a schematic block diagram to illustrate that different versions of a data structure can be used in the generation of a compressed representation of an object.

FIG. 9 is a schematic block diagram to illustrate that different versions of a data structure can be used in the generation of a compressed representation of an object. Accordingly, in an example embodiment to be described in the following, an original data structure 100 to be compressed is copied to form a working uncompressed data structure 110 that than then be processed and compressed as described in the following to form a compressed data structure 120. In the example embodiment to be discussed, compressed values that are computed during sequential processing of the elements of the uncompressed working data structure are fed back to or a re-injected into the working uncompressed data structure so that they can be used in the processing of further elements to avoid the propagation of errors. The original data structure, the working data structure and the compressed data structure can be held in the memory 14 of the computer system, subject to capacity. Alternatively, they can be held in the storage 26, and relevant parts of the data structures currently being processed can be brought into the memory 14.

Figure 10:
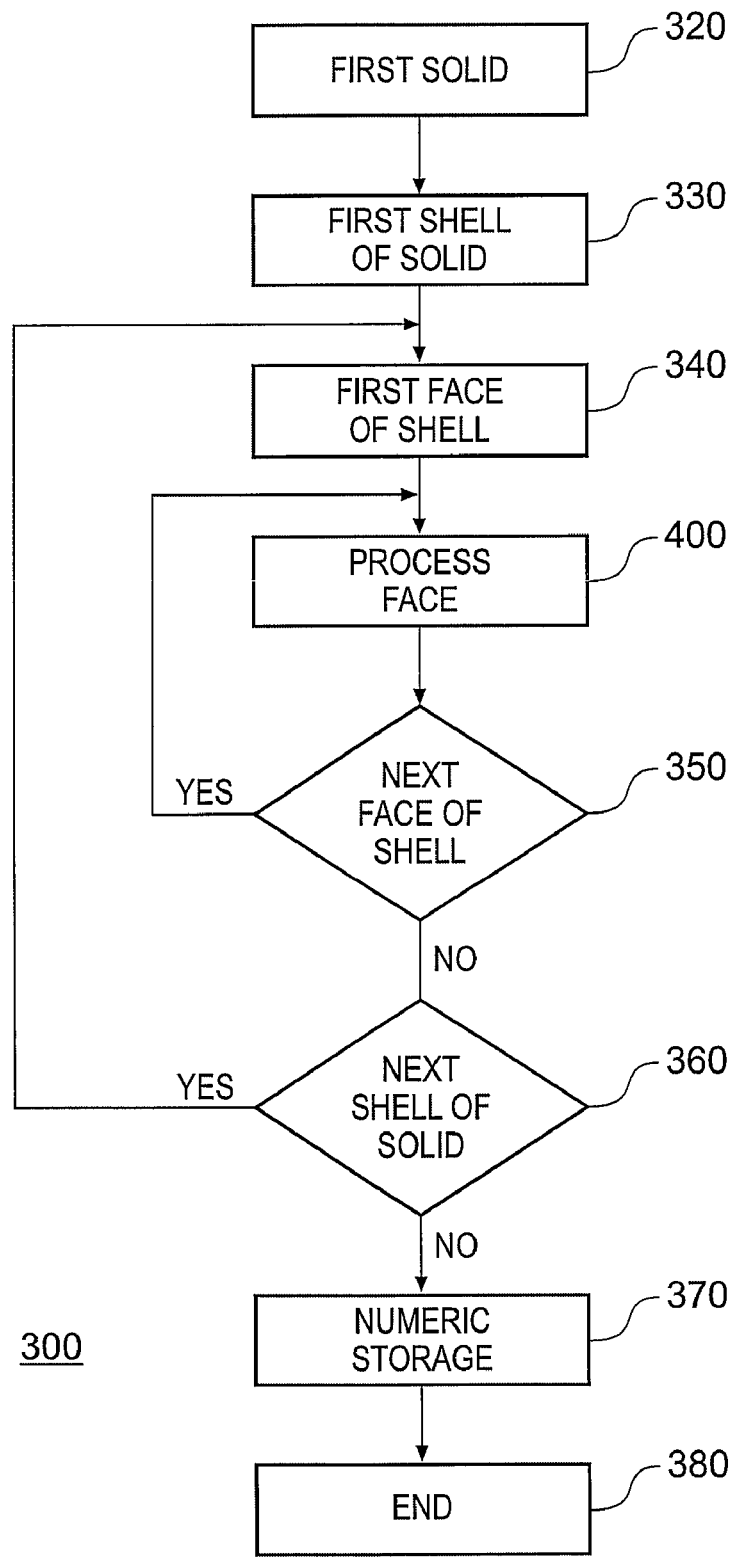
FIG. 10 is a flow diagram giving an overview of part of a method of compressing a graphical data structure.

FIG. 10 is a flow diagram providing an overview of a method of compressing a working uncompressed graphical data structure 110 representing an object.

In step 320, the working graphical data structure is accessed for a first solid.

In step 330, the working graphical data structure is accessed for a first shell for the solid.

In step 340, the working graphical data structure is accessed for a first face of the shell.

In step 400 the first face is processed. The processing is described below with reference to FIG. 11.

In step 350, after processing the face, if there is another face of the shell to be processed, then control passes back to step 400 to process the next face.

If, in step 350, it is determined that there is not another face of the shell to be processed, then control passes to step 360.

In step 360, if there is another shell of the solid to be processed, then control passes back to step 340 to process the next shell.

If, in step 360, it is determined that there is not another shell of the solid to be processed, then control passes to step 370.

In step 370, numeric storage in the compressed database 120 is performed, as will be described below with reference to FIG. 13.

In step 380, the method 300 represented in FIG. 8 comes to an end.

Figure 11:
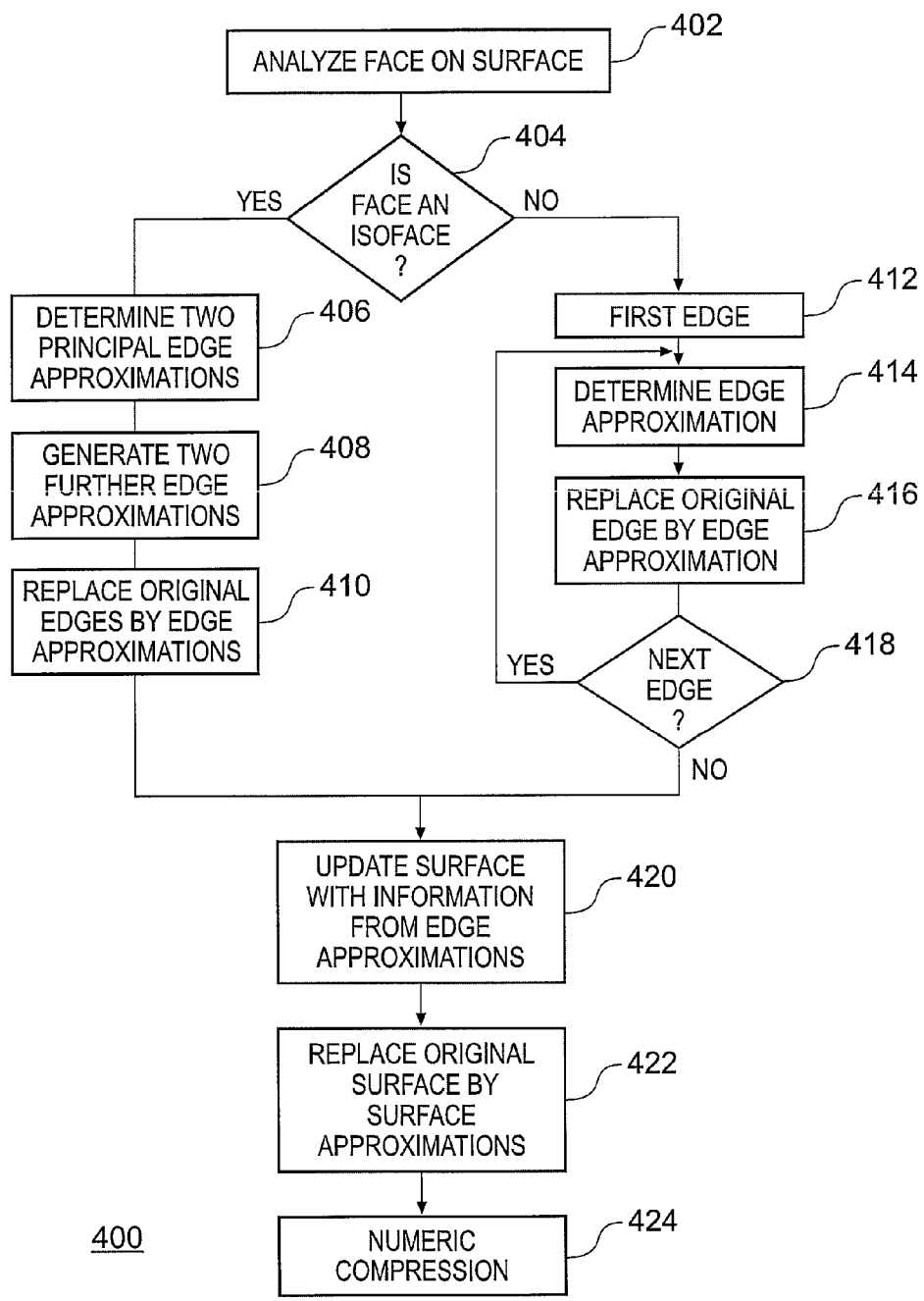
FIG. 11 is a flow diagram illustrating a part of the method of FIG. 10 in more detail.

FIG. 11 is a flow diagram illustrating in more detail an example of the processing of a face represented in step 400 in FIG. 10.

In step 402, the face (as represented in the working database 110) is analyzed on the surface to determine whether the face has a shape that corresponds at least approximately to a standard form of face, or isoface, that can be represented in a particularly compact manner. An example of such an isoface would be a rectangle in parametric space, that is a four sided face two pairs of parallel straight sides on the surface on which the face is defined. In analyzing a face, an exact match to the isoface need not be required. Indeed, to achieve significant compression, it is desirable to determine faces that approximate to isofaces within predetermined criteria that can be set by a user.

The analysis of the face can use standard techniques for matching the curves to predetermined line shapes. For example the curves forming the edges of the loop for a face can be matched to straight lines, and when there is a predetermined level of match, the curve can be approximated to a straight line.

The matching is performed on the surface on which the face is defined. For example, with reference to FIGS. 6 and 7, the matching is performed in the plane of the surface as represented in FIGS. 6B and 7B.

The face represented in FIG. 6 can, for example, be determined to approximate to a rectangle in parametric space as the edges 63 and 65 are parallel straight lines in the plane 60 and the edges 62 and 64 approximate to parallel straight lines in the plane 60. Accordingly, the face 51 can be held to be an isoface. FIG. 6C represents the approximation of the face 51 as mapped into the plane 70, with the straight parallel edges 53/63 and 54/64 corresponding to the straight parallel edges 73 and 74 and the curves 52/62 and 54/74 replaced by straight parallel edges 72 and 74.

The parallelogram can be held to be an isoface as it can then be represented in a particularly efficient manner, namely in terms of two adjacent sides and that it is a parallelogram, it being known that the remaining two sides of the parallelogram are parallel to those two sides.

In contrast thereto, it can be determined that the face represented in FIG. 7 does not approximate to a parallelogram as the edges 92 and 94 do not approximate to parallel straight lines as those lines deviate too far from a straight line. It can, for example, be determined that they approximate instead to first and second curves of a given radius as represented at 102 and 104 in FIG. 7C. However, although there is an approximation for those edges, the face 81 would not be held to be an isoface and would instead be replaced by an approximation as represented in FIG. 7C forming an non-isoface 101 that includes two straight lines 103 and 105 and the two simple curves 102 and 104 in the plane 100.

Accordingly, in step 404, if it is determined that the result of the analysis of step 402 is that the face under examination is an isoface, then in step 406 the two principal edge approximations are determined (say in FIG. 6C, edges 72 and 73), in step 408 two further edge approximations are generated (say in FIG. 6C the edges 74 and 75 parallel to the edges 72 and 73, respectively), in step 410 the edge definitions for the face in the working data structure are replaced by the approximations in the compressed data structure.

Alternatively, if in step 404 it is determined that the result of the analysis of step 402 is that the face under examination is not an isoface, then in step 412 the first edge of the loop for the face is selected (say edges 82/92 in FIGS. 7A/B), in step 414 an edge approximation is determined for that edge (say the simple curve 102 in FIG. 7C), in step 416 the original edge definition (say, complex curve 82/92) for the face in the working data structure is replaced by the approximation (say simple curve 102) in the compressed data structure 120; and if it is determined in step 418 that a further edge is to be processed for the face then the process goes to step 414 for the next edge.

Following step 410, or following step 418 where there are no further edges for the face, then in step 420, the surface definition in the working data structure 110 is replaced in that working data structure 110 by information from the edge approximations.

In step 422, the original surface definition in the working data structure 110 is replaced, where a surface approximation exists, in the working data structure 110 by the surface approximation. Although in the examples described above the faces are described as being defined on simple surfaces, here cylinders, in other examples faces could be defined on more complex surfaces have more complex mathematical definitions. Accordingly, in this step an actual surface definition is compared to simpler surface definitions and, where the simpler surface definition approximates the complex surface definition with acceptable tolerances (e.g., using a best fit methodology), the simple surface definition can be used to replace the complex surface definition in the compressed data structure to effect compression of that definition. In addition, by feeding back, or re-injecting this approximation of the surface definition for a face to the working data structure 110 when the face is processed, the revised surface definition can then be used for computations in respect of subsequently processed faces to ensure data integrity.

In step 424, numeric compression for digital values used in respect of the face is performed and the compressed numeric values are fed back, or re-injected into the working database 110.

Figure 12:
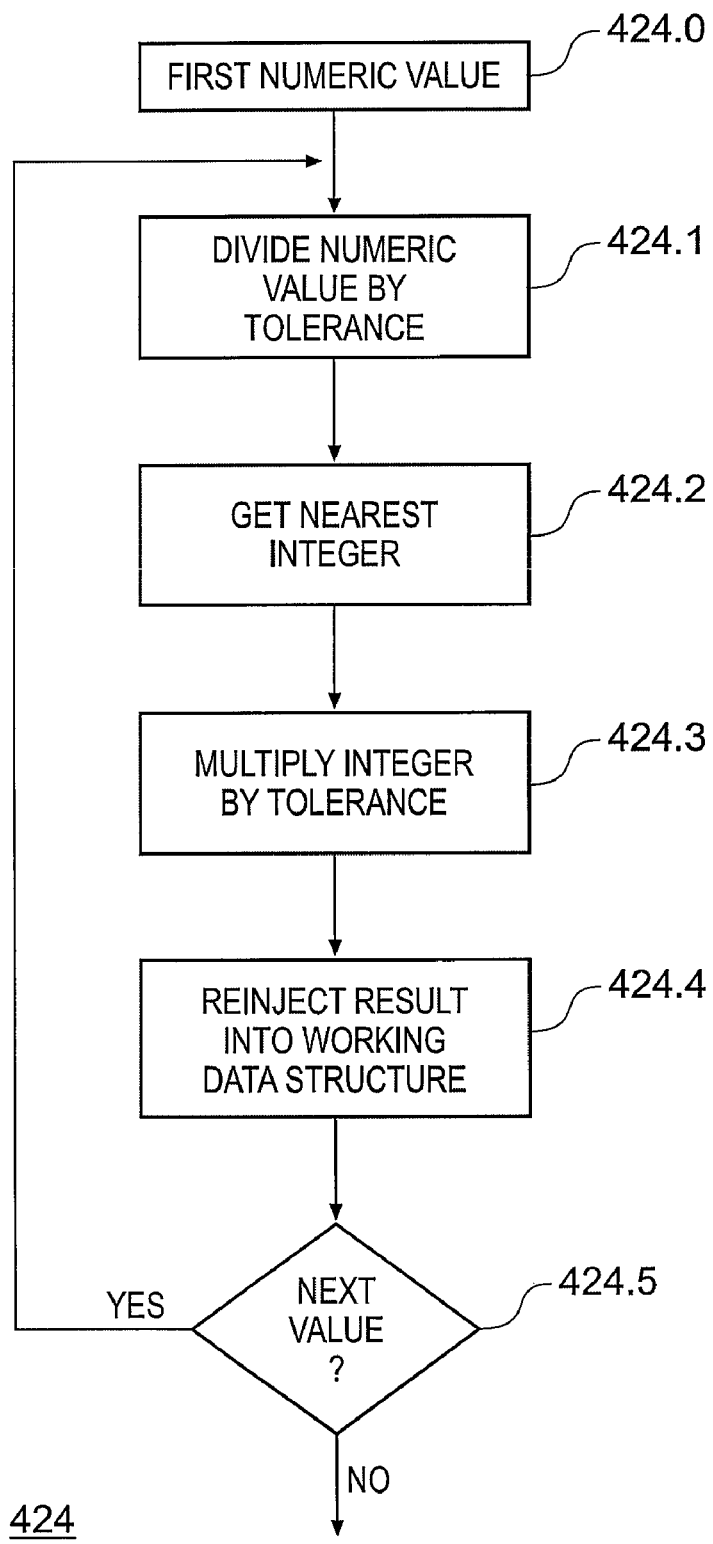
FIG. 12 is a flow diagram illustrating a part of the method of FIG. 11 in more detail.

FIG. 12 illustrates step 424 of performing numeric compression in more detail. This provides truncation and numerical approximation of digital values to provide lossy compression of the numerical values in a re-writeable manner.

In step 424.0, a first numeric value for a face is read from the working database 110.

In step 424.1, the numeric value is divided by a tolerance factor that defines a desired degree of approximation.

In step 424.2, the next nearest integer to the result of the division in step 424.1 is taken.

In step 424.3, the integer is multiplied by the tolerance factor.

In step 424.4, the floating point number that results from the multiplication is fed back to or re-injected into the working data structure.

In step 424.5, if there is a further numeric value for the face, then this is processed at step 424.1, otherwise the numeric compression process terminates.

It can be seen from this process that providing approximations of the definitions of the faces and of the edges of the faces can reduce the information needed to represent a face and thereby to provide for data compression.

By feeding back the approximations into the model of the object formed by the graphical data structure as each face is processed, the propagation of errors can be avoided and a reproducible data set can be provided that can be repeatedly compressed and decompressed. This is explained in that although single faces are represented in FIGS. 6A and 6B, in a complex object as represented, for example, in FIG. 5, it will be appreciated that the edge of one face can form an edge of an adjacent face so as to form the surface of the object. By feeding back, or re-injecting, the approximations into the model as they are generated for one face, the approximation for one edge of a face can then be used for processing an adjacent face. The result of this is computation of succeeding faces can be consistent and discrepancies can be avoided. Also, as rounding errors can occur in complex graphical computations, the avoidance of errors resulting from inconsistent rounding for adjacent faces can be avoided as the approximation for one edge can then be used for an adjacent edge in a consistent manner, thereby providing data integrity.

It will be appreciated that further compression can be employed to further reduce the degree of compression to be applied.

Also, further compression of the digital values can be performed on storage in the compressed data structure 120.

Figure 13:
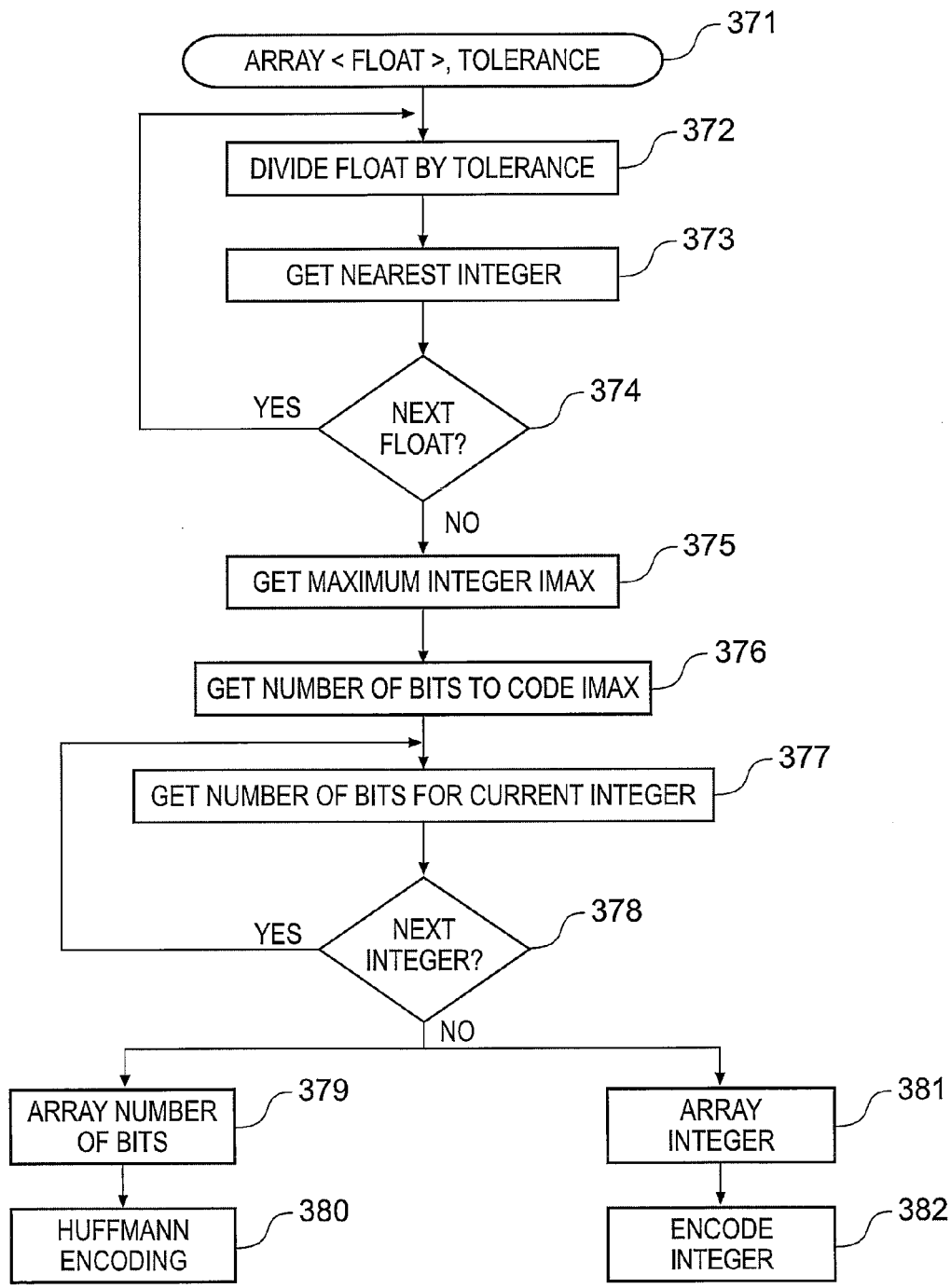
FIG. 13 is a flow diagram illustrating another part of the method of FIG. 8 in more detail.

FIG. 13 is a flow diagram illustrating an example of the numeric storage used.

The numerical values 371 are represented as an array of floating point numbers (float) and the tolerance value referred to with respect to FIG. 12. The process starts for a first floating point number.

In step 372, the floating point number is divided by the tolerance.

In step 373, the nearest integer is taken.

In step 374, if there is a further floating point number, then this is processed in step 372.

Otherwise, when all floating point numbers have been processed, then in step 375, a maximum integer value is determined (Imax).

In step 376, the number of bits to encode Imax is identified. The process then continues for the first integer.

In step 377, the number of bits for the current integer is determined

In step 378, if there is a further integer, then this is processed at step 377 as the current integer.

Otherwise, following step 378, the process is complete with the result being a first array of numbers of bits for each integer in step 379, and a second array containing the respective integers in step 381. In other words, the arrays have the same number of entries, with the array of step 381 having the integers and the array of step 379 having the number of bits for each of those integers.

In step 380, the array of step 379 is Huffman encoded, and in step 382, each value of the array of integers of step 381 is encoded with the number of bit computed in step 377.

Using numeric compression as represented in FIG. 13 can reduce the amount of storage required to represent a digital value.

With reference to FIG. 9, an example of compressed geometrical structure can be stored in the copy data storage 120, for representing compactly an approximation of Bspline surfaces. Compact Bspline surface parameters are described in Table 1 below:

TABLE 1

| NAME | TYPE | DESCRIPTION |
|---|---|---|
| compression_tolerance | double | tolerance to approximate surfaces |
| compressed_control_point | double | contains compressed control points |
| control_point_type | integer | describe compression of control points |
| compressed_knot | double | describes nodal vector of BSpline surfaces |
| tolerance_parameter | double | tolerance to approximate parameters |

The compression_tolerance describes the precision used to store compact Bspline parameters.

The compressed_control_points contain double values. At the beginning of the compression process, the original surface 100 is copied in a working structure 110 that is updated step by step.

Figure 14:
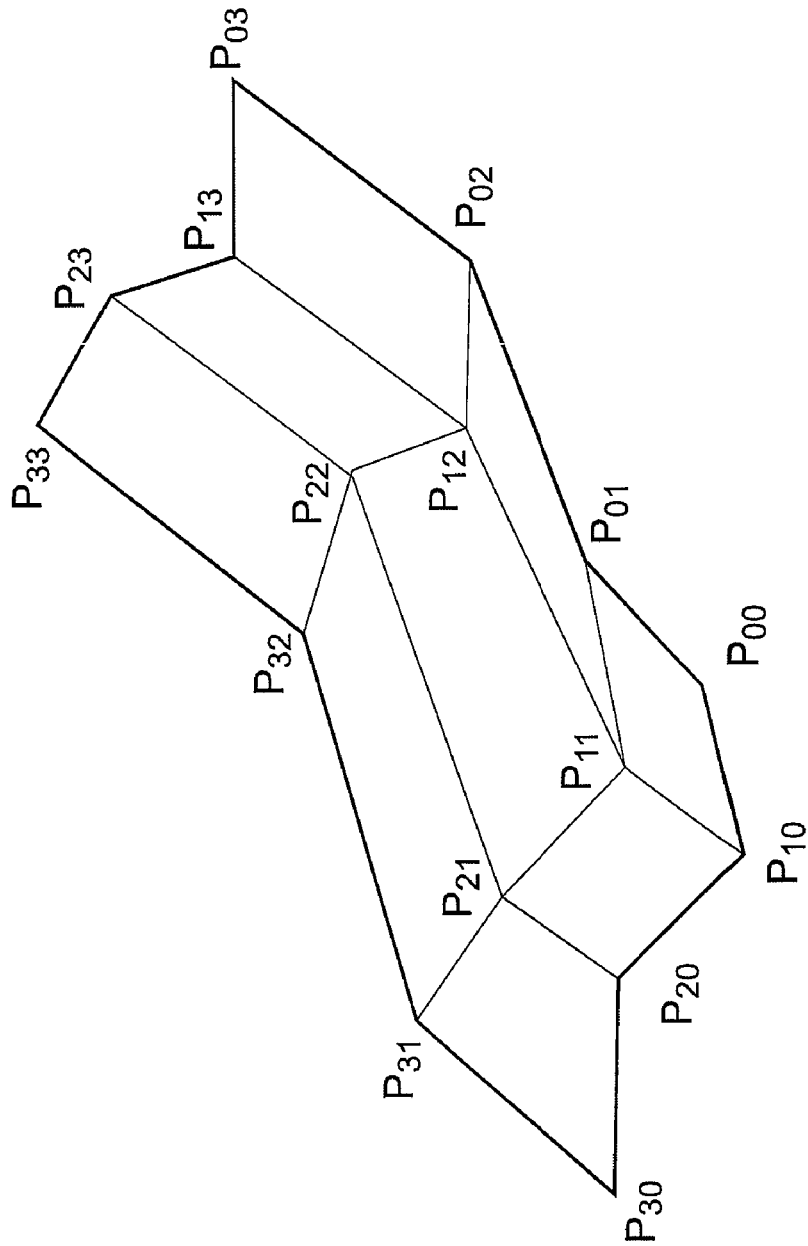
FIG. 14 is a representation of a surface for further explaining the compression of control points.

With reference to FIG. 14, an example of the compression steps for a surface is described.

The coordinates for a first coordinate point $P_{00}$ can be written as compressed_control_point values into the copy data structure 120 such that $P_{00\_}$compressed$=P_{00}$.

The coordinate points $P_{10}$-$P_{00}$ can then be computed and each vector component can be approximated to the nearest multiple of the surfaces_tolerance. The resulting truncated vector can then be stored as compressed_control_point values in the copy data structure 120. The compressed values of this coordinate ($P_{10\_}$compressed) can then be calculated as follows:

$$P_{10\_}\text{compressed} = (P_{10}-P_{00})\text{truncated} + P_{00\_}\text{compressed}.$$

This values for this coordinate point can then be re-injected in the working data structure 110 as described earlier with reference to FIG. 12 to avoid the propagation of errors, for example as a result of the truncation.

In the same way, the coordinate values for the next coordinate point $P_{20}$ can be computed as difference value ($P_{20}$-$P_{10\_}$compressed)truncated and this can be stored as compressed_control_point values. The $P_{20\_}$compressed coordinate values can then be computed and are re-injected in the working structure 110.

This process can then be continued with the values for the remaining external coordinate points $P_{i0}$ and $P_{0i}$ being calculated and re-injected as described above.

The internal compressed control points ($P_{i,j}$), where i>0 and j>0 can then be computed using the previously stored points.

For each i and for each j, Pij_compressed is computed $$\vec{V} = P_{j,i-1} - P_{j-1,i-1}$$

$$\vec{U} = P_{j-1,i} - P_{j-1,i-1}$$

$$\vec{N} = \vec{U} \wedge \vec{V}$$

$$P_{i,j(compressed)} = P_{i,j} - P_{i-1,j-1} + \vec{V} + \vec{U}$$

Four cases are considered:

If $P_{ij}$ is less than compression_tolerance, the control_point_type is zero and no compressed_control_point values are stored in the copy data structure 120. The following value is then stored in the working data structure 110 to replace $P_{i,j}$.

$$P_{i-1,j-1} = \vec{V} + \vec{U}$$

Otherwise, $P_{i,j}$ is evaluated using the following coordinate system:

$$P_{i,j} = \left( P_{i,j(compressed)} \cdot \frac{\vec{U}}{\|\vec{U}\|}, P_{i,j(compressed)} \cdot \left( \frac{\vec{N}}{\|\vec{N}\|} \wedge \frac{\vec{U}}{\|\vec{U}\|} \right), P_{i,j(compessed)} \cdot \frac{\vec{N}}{\|\vec{N}\|} \right)$$

If the z component length is less than compression_tolerance, the control_point_type is set to 2 and the coordinate x and y are added to the compressed_control_point values in the copy data structure 120.

If $x^2+y^2$ value is less than compression_tolerance, then the control_point_type is set to 1 and z is added to the compressed_control_point values in the copy data structure 120.

For other cases, x, y and z are stored as compressed_control_point values in the copy data structure 120, and the control_point_type is set to 3.

Three example types of U,V parameterization between 0 and 1 are considered in the following. In the present example U parameters are treated first, followed by V parameters.

If the parameterization is uniform, no parameters are stored as compressed_knot values in the copy data structure 120.

If the parameterization is pseudo-uniform, then an interval between the two first parameters and then the two end parameters is stored.

Otherwise, internal parameters are stored compressed_knot values in the copy data structure 120 with, for each internal parameter, a difference between a preceding compressed parameter being computed and truncated using the tolerance_parameter.

A compressed Hermitte curve structure can be used to store a compact representation of a Bspline curve with degree 3 as described with reference to Table 2 below.

TABLE 2

| NAME | TYPE | DESCRIPTION |
|---|---|---|
| compression_tolerance | double | tolerance to approximate surfaces |
| compressed_points | double[ ] | contains compressed control points |
| compressed_tangents | double[ ] | describes how control points compressed |
| point_number_bits | integer | bits for compressed_point coordinate |
| tangent_number_bits | integer | tangents for each tangent coordinate |

The start and end points of a curve are explicitly stored. The compressed points (Ptc) and compressed_tangent ($Tgt_c$) values allow the computation of a control polygon. The compressed_points values contain the points on curve stored in terms of a difference with respect to a preceding point on the curve:

$$P_0 = StartPt$$

$$P_{4i} = P_{4 \times (i-1)} + (Pt_c[i \times 3], Pt_c[i \times 3+1(2)], Pt_c[i \times 3+2])$$

$$P_n = End$$

The compressed_tangents values contain tangents to the curve at each compressed point ($Pt_c$). The tangents are used to determine two controls points between each point on the uncompressed curve.

$$P_1 = P_0 + \frac{\overrightarrow{(Tgt_c[0], Tgt_c[1], Tgt_c[2])}}{\|\overrightarrow{P_3 - P_0}\|}$$

$$P_2 = P_3 + \frac{\overrightarrow{(Tgt_c[3], Tgt_c[4], Tgt_c[5])}}{\|\overrightarrow{P_3 - P_0}\|}$$

Bspline knot values are implicit and can be computed from the control points.

$$U_0 = 0$$

$$U_i = U_{i-1} + \|\overrightarrow{P_{4i} - P_{4i-1}}\|$$

Accordingly, there has been described a computer-implemented method, an apparatus and computer program product for compressing a digital representation of an object. The digital representation can include a graphical data structure with graphical data defining the object in terms of a definition of respective faces of the object. Each face can be defined in terms of a surface for the face and each edge of the face on that surface. Adjacent faces share a common edge. The method can include, for respective faces of the object, accessing the definition of the face in the graphical data structure, generating a compressed definition of the face and replacing the definition of the face in the graphical data structure by the compressed definition of the face.

There has also been described a data structure forming a product of the aforementioned method for modeling a solid forming at least a part of an object. The data structure can comprise one or more parameter fields, wherein at least one of the parameter fields comprises a compressed representation of a parameter.

A computer program product for implementing the invention can be in the form of a computer program on a carrier medium in the form of a computer readable medium. The data structure can also be provided on a carrier medium. The carrier medium could be a storage medium, such as a solid state, magnetic, optical, magneto-optical or other storage medium. The carrier medium could be a transmission medium such as broadcast, telephonic, computer network, wired, wireless, electrical, electromagnetic, optical or indeed any other transmission medium.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method comprising:
performing, by a computer:
obtaining a digital representation of an object, the digital representation comprising a data structure, wherein the data structure comprises definitions for a plurality of faces of the object, wherein each face is defined in terms of a three-dimensional surface for the face and a plurality of edges of the face that form a closed boundary of the face on the respective surface, wherein each edge of the face is defined in terms of two vertices at respective ends of the edge and a definition of a curve on the respective surface;
analyzing each of two or more of the plurality of faces to determine if the face forms a geometric shape that at least approximately matches one of one or more specified geometric shapes;
for each of at least one of the two or more faces that forms a geometric shape that at least approximately matches one of the one or more specified geometric shapes, generating a compressed definition of the face that represents the face in terms of a compressed representation of the at least approximately matching geometric shape;
for each of one or more others of the two or more faces that forms a geometric shape that does not at least approximately match one of the one or more specified geometric shapes, generating a compressed definition of the face that represents each edge of the face as a curve that at least approximately matches the edge as defined in the data structure; and
wherein at least one of the curves is a non-straight-line curve;
for each of the two or more faces, replacing the definition of the face in the data structure with the generated compressed definition of the respective face.

2. The method of claim 1, wherein said generating a compressed definition of the face that represents each edge of the face as a curve that at least approximately matches the edge as defined in the data structure comprises, for at least one edge of the face:
determining that the edge as defined in the data structure at least approximately matches one of one or more specified curves; and
representing the edge in the compressed definition of the face as the at least approximately matching specified curve.

3. The method of claim 1, wherein the compressed definition of the face that represents the face in terms of the compressed representation of the at least approximately matching geometric shape represents the face in terms of two principal edges of the face and a geometric property of the at least approximately matching geometric shape.

4. The method of claim 1, wherein the definition of each face in the data structure comprises a plurality of digital values representing coordinates of the vertices of the edges of the respective face, wherein the method further comprises compressing the digital values in at least one compressed definition by reducing a number of bits of the digital values.

5. The method of claim 4, wherein the method further comprises using the compressed digital values for coordinates of at least two vertices of a first face as the compressed digital values for coordinates of at least two vertices for a second face that shares a common edge with the first face.

6. A system, comprising:
storage storing a digital representation of an object, the digital representation comprising a data structure, wherein the data structure comprises definitions for a plurality of faces of the object, wherein each face is defined in terms of a three-dimensional surface for the face and a plurality of edges of the face that form a closed boundary of the face on the respective surface, wherein each edge of the face is defined in terms of two vertices at respective ends of the edge and a definition of a curve on the respective surface;

a processor; and a memory comprising program code executable by the processor to:

analyze each of two or more of the plurality of faces to determine if the face forms a geometric shape that at least approximately matches one of one or more specified geometric shapes;

for each of at least one of the two or more faces that forms a geometric shape that at least approximately matches one of the one or more specified geometric shapes, generate a compressed definition of the face that represents the face in terms of a compressed representation of the at least approximately matching geometric shape;

for each of one or more others of the two or more faces that forms a geometric shape that does not at least approximately match one of the one or more specified geometric shapes, generate a compressed definition of the face that represents each edge of the face as a curve that at least approximately matches the edge as defined in the data structure; and wherein at least one of the curves is a non-straight-line curve;

for each of the two or more faces, replace the definition of the face in the data structure with the generated compressed definition of the respective face.

7. The system of claim 6, wherein, in said generating a compressed definition of the face that represents each edge of the face as a curve that at least approximately matches the edge as defined in the data structure, the program code is executable by the processor to, for at least one edge of the face:

determine that the edge as defined in the data structure at least approximately matches one of one or more specified curves; and represent the edge in the compressed definition of the face as the at least approximately matching specified curve.

8. The system of claim 6, wherein the compressed definition of the face that represents the face in terms of the compressed representation of the at least approximately matching geometric shape represents the face in terms of two principal edges of the face and a geometric property of the at least approximately matching geometric shape.

9. The system of claim 6, wherein the definition of each face in the data structure comprises a plurality of digital values representing coordinates of the vertices of the edges of the respective face, wherein the program code is executable by the processor to compress the digital values in at least one compressed definition by reducing a number of bits of the digital values.

10. The system of claim 9, wherein the program code is executable by the processor to use the compressed digital values for coordinates of at least two vertices of a first face as the compressed digital values for coordinates of at least two vertices for a second face that shares a common edge with the first face.

11. A non-transitory computer readable storage medium storing program code computer-executable to:

obtain a digital representation of an object, the digital representation comprising a data structure, wherein the data structure comprises definitions for a plurality of faces of the object, wherein each face is defined in terms of a three-dimensional surface for the face and a plurality of edges of the face that form a closed boundary of the face on the respective surface, wherein each edge of the face is defined in terms of two vertices at respective ends of the edge and a definition of a curve on the respective surface;

analyze each of two or more of the plurality of faces to determine if the face forms a geometric shape that at least approximately matches one of one or more specified geometric shapes;

for each of at least one of the two or more faces that forms a geometric shape that at least approximately matches one of the one or more specified geometric shapes, generate a compressed definition of the face that represents the face in terms of a compressed representation of the at least approximately matching geometric shape;

for each of one or more others of the two or more faces that forms a geometric shape that does not at least approximately match one of the one or more specified geometric shapes, generate a compressed definition of the face that represents each edge of the face as a curve that at least approximately matches the edge as defined in the data structure; and wherein at least one of the curves is a non-straight-line curve;

for each of the two or more faces, replace the definition of the face in the data structure with the generated compressed definition of the respective face.

12. The non-transitory computer readable storage medium of claim 11, wherein, to generate a compressed definition of the face that represents each edge of the face as a curve that at least approximately matches the edge as defined in the data structure, the program code is computer-executable to, for at least one edge of the face:

determine that the edge as defined in the data structure at least approximately matches one of one or more specified curves; and represent the edge in the compressed definition of the face as the at least approximately matching specified curve.

13. The non-transitory computer readable storage medium of claim 11, wherein the compressed definition of the face that represents the face in terms of the compressed representation of the at least approximately matching geometric shape represents the face in terms of two principal edges of the face and a geometric property of the at least approximately matching geometric shape.

14. The non-transitory computer readable storage medium of claim 11, wherein the definition of each face in the data structure comprises a plurality of digital values representing coordinates of the vertices of the edges of the respective face, wherein the program code is computer-executable to compress the digital values in at least one compressed definition by reducing a number of bits of the digital values.

15. The non-transitory computer readable storage medium of claim 14, wherein the program code is computer-executable to use the compressed digital values for coordinates of at least two vertices of a first face as the compressed digital values for coordinates of at least two vertices for a second face that shares a common edge with the first face.

* * * * *